United States Patent
Skrodzki

(10) Patent No.: US 10,953,838 B2
(45) Date of Patent: Mar. 23, 2021

(54) DOUBLE AIRBAG SYSTEM FOR PROTECTING LARGER PASSENGER SPACES

(71) Applicant: AUDI AG, Ingolstadt (DE)

(72) Inventor: Tobias Skrodzki, Gaimersheim (DE)

(73) Assignee: Audi AG, Ingolstadt (DE)

( * ) Notice: Subject to any disclaimer, the term of this patent is extended or adjusted under 35 U.S.C. 154(b) by 83 days.

(21) Appl. No.: 16/485,621

(22) PCT Filed: Feb. 13, 2018

(86) PCT No.: PCT/EP2018/053487
§ 371 (c)(1),
(2) Date: Aug. 29, 2019

(87) PCT Pub. No.: WO2018/149801
PCT Pub. Date: Aug. 23, 2018

(65) Prior Publication Data
US 2020/0047703 A1    Feb. 13, 2020

(30) Foreign Application Priority Data

Feb. 14, 2017  (DE) .......................... 102017202332.5

(51) Int. Cl.
*B60R 21/233* (2006.01)
*B60R 21/231* (2011.01)
*B60R 21/26* (2011.01)

(52) U.S. Cl.
CPC ............ *B60R 21/233* (2013.01); *B60R 21/26* (2013.01); *B60R 2021/23107* (2013.01); *B60R 2021/23324* (2013.01); *B60R 2021/26058* (2013.01)

(58) Field of Classification Search
CPC ........ B60R 21/233; B60R 2021/23324; B60R 2021/26058; B60R 21/26; B60R 2021/23107
See application file for complete search history.

(56) References Cited

U.S. PATENT DOCUMENTS 6,485,052 B2 * 11/2002 Specht .................. B60R 21/213
                                                        280/736
6,536,799 B2 *  3/2003 Sinnhuber ............. B60R 21/233
                                                        280/732
(Continued)

FOREIGN PATENT DOCUMENTS

DE      3833888 A1    4/1990
DE     19628837 A1    1/1997
(Continued)

OTHER PUBLICATIONS

"Machine language translation of DE 10333991A1, obtained from google.com/patents on Dec. 31, 2020".*
(Continued)

*Primary Examiner* — Ruth Ilan
*Assistant Examiner* — Caitlin Anne Miller
(74) *Attorney, Agent, or Firm* — Sterne, Kessler, Goldstein & Fox P.L.L.C.

(57) ABSTRACT

The invention relates to an airbag system for a vehicle, including a first airbag and a second airbag situated largely above the first airbag in the intended main supporting direction. Both airbags may be triggered chronologically. In the airbag system both airbags may include a separate gas supply and may effectively interact to provide a larger airbag volume without substantial loss of time. When both airbags are activated, the second airbag deploys largely on the surface of the first airbag. Due to the separate gas supply, both airbags may be triggered simultaneously and independently of one another. It is also possible for only the second
(Continued)

airbag to be triggered and for the first airbag to remain inactive. Thus, the airbag system covers a wider range of load conditions. The system helps by allowing the vehicle occupants more freedom in choosing their sitting positions.

8 Claims, 1 Drawing Sheet

(56) References Cited

U.S. PATENT DOCUMENTS

| | | | | |
|---|---|---|---|---|
| 6,971,664 | B2* | 12/2005 | Amamori | B60R 21/231 |
| | | | | 280/729 |
| 8,408,593 | B2* | 4/2013 | Kuhlmann | B60R 21/205 |
| | | | | 280/732 |
| 9,248,799 | B2* | 2/2016 | Schneider | B60R 21/26 |
| 2005/0184489 | A1 | 8/2005 | Kobayashi | |
| 2005/0269808 | A1* | 12/2005 | Song | B60R 21/231 |
| | | | | 280/732 |
| 2006/0022439 | A1* | 2/2006 | Bayley | B60R 21/23138 |
| | | | | 280/729 |
| 2008/0048420 | A1* | 2/2008 | Washino | B60R 21/231 |
| | | | | 280/731 |
| 2008/0054602 | A1* | 3/2008 | Yang | B60R 21/231 |
| | | | | 280/729 |
| 2011/0140399 | A1 | 6/2011 | Kuhlmann | |
| 2019/0106075 | A1* | 4/2019 | Deng | B60R 21/2165 |
| 2019/0135220 | A1* | 5/2019 | Rupp | B60R 21/237 |
| 2019/0381968 | A1* | 12/2019 | Kwon | B60R 21/239 |
| 2020/0055479 | A1* | 2/2020 | Seyffert | B60R 21/231 |

FOREIGN PATENT DOCUMENTS

| | | | |
|---|---|---|---|
| DE | 19860823 | A1 | 7/2000 |
| DE | 19925378 | A1 | 12/2000 |
| DE | 20107108 | U1 | 9/2001 |
| DE | 10052599 | A1 | 5/2002 |
| DE | 10333991 | A1 | 3/2005 |
| DE | 602005002762 | T2 | 7/2008 |
| DE | 102009052691 | A1 | 5/2011 |
| DE | 102015015801 | A1 | 6/2017 |
| JP | H11245759 | A | 9/1999 |
| JP | 2008179173 | A | 8/2008 |
| KR | 1020010055579 | A | 7/2001 |

OTHER PUBLICATIONS

International Search Report and Written Opinion of the International Searching Authority directed to related International Patent Application No. PCT/EP2018/053487, dated Apr. 16, 2018, with attached English-language translation; 15 pages.

International Preliminary Report on Patentability directed to related International Patent Application No. PCT/EP2018/053487, completed Mar. 13, 2019, with attached English-language translation; 11 pages.

* cited by examiner

DOUBLE AIRBAG SYSTEM FOR PROTECTING LARGER PASSENGER SPACES

TECHNICAL FIELD

The present invention relates to an airbag system for a vehicle comprising a first airbag and a second airbag situated largely above the first airbag in the intended main direction of support, and both airbags may be triggered simultaneously. The present invention also relates to a method for operating an airbag system for a vehicle, wherein the airbag system comprises a first airbag and a second airbag situated largely above the first airbag in the intended main direction of support and both airbags may be triggered simultaneously.

BACKGROUND

Airbags in vehicles contribute significantly to increasing occupant safety. The size of an airbag is limited by various physical parameters. It is currently limited in its volume, because a single airbag becomes unstable with increasing volumes. In addition, larger airbags are not so rapidly inflatable. An inflator for airbags is not able to fill arbitrarily large airbags in a required amount of time. The airbag systems available today are sufficient to protect the vehicle occupants, if the vehicle occupants are in the intended standard sitting position. A standard sitting position is the sitting position currently provided in vehicles, in which the guidance of the vehicle is left to one person. Such a standard sitting position is assumed, for example, by a driver or passenger on his/her seat, wherein the passenger faces the direction of travel.

Due to advances in autonomous driving or in piloted driving, it is not always absolutely necessary for the vehicle occupants to have to remain in their standard sitting positions. Thus, there is a need to leave the standard sitting position and assume a different position within the vehicle. Such sitting positions that differ from the standard sitting positions are often referred to as "out-of-position" (OoP) positions. If a vehicle occupant is in an OoP position, he/she is no longer positioned in the provided area of protection of an airbag. Other different situations and load conditions also mean that a vehicle occupant is no longer optimally protected by an airbag. Such situations are, for example, vehicle occupants who are not buckled up, so-called passive load conditions, or who move away from a dashboard, for example, in order to assume a sleeping position. Also conceivable are so-called "oblique-load conditions", in which a vehicle occupant strikes an airbag obliquely. Such sitting positions that differ from the standard sitting positions are described below by the OoP positions. Even in these cases, it is highly desirable if, in the event of an accident, an airbag system is present which is able to effectively protect the vehicle occupants who are in an OoP position. Such OoP positions are made possible by piloted or autonomous driving, since a driver is not required to constantly have control of his vehicle. In order to allow the vehicle occupant greater freedom in the selection of sitting positions, without exposing them to an excessive risk of injury in an accident, larger, voluminous and more stable airbags are needed, which must nevertheless be filled in a very short period of time. This is not manageable or manageable only insufficiently with today's systems and technologies.

The document DE 100 52 599 A1 discloses a double airbag, which consists of two superimposed airbags. The first airbag is kept flatter by seven centimeters in volume than the conventional airbag, and is filled with the standard air pressure. The second airbag is placed within the pared down volume but filled with reduced air pressure so that it cushions the head like a feather pillow.

The utility model DE 201 07 108 U1 relates to an airbag grid adjustment to body size. The grid adjustment of 1.5 meters to 2.0 meters is adapted to a 5 centimeter grid adjustment of the body size.

The document DE 60 2005 002 762 T2 relates to a double-airbag device comprising a double-airbag and a support airbag. The double airbag in this case may include a left and a right airbag. This document describes exemplary operations of the airbag system. In this case, certain airbags may deploy while others may not. The level of inflation of the double airbag may be adapted as a function of the sitting position and of the size of the passenger.

The document KR 10 2001 00 555 79 A operates a double airbag system. A first airbag is situated below a second airbag. Controllable air nozzles are installed between both airbags. By controlling these air nozzles, it is possible to control the amount of air that is to enter the second airbag.

The present documents provide no indication of how an inflation time of an airbag may be shortened or how larger, more stable airbags may be provided on a timescale similar to a single airbag.

BRIEF DESCRIPTION OF THE DRAWINGS/FIGURES

DETAILED DESCRIPTION

Figure 1:
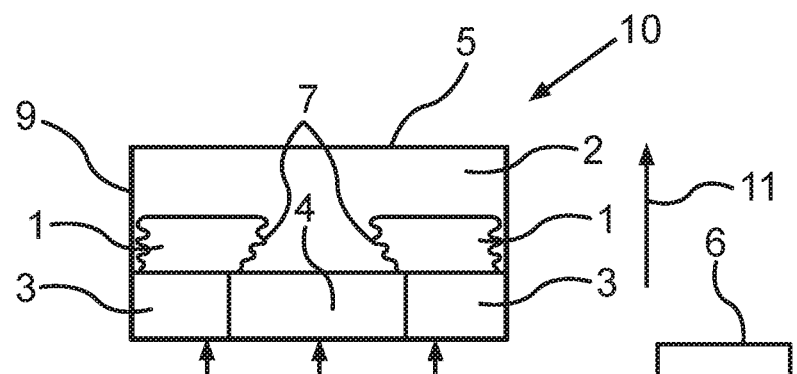
FIG. 1 illustrates a side view of an airbag system in the untriggered state, according to some embodiments of this disclosure.

The object of the present invention is thus to provide an airbag volume during the currently realistic inflation time of an airbag, which is greater than ever before. A corresponding airbag system and a corresponding operating method are to be provided.

This object is achieved according to the invention by an airbag system for a vehicle according to the independent claims. According to the invention, a method according to the independent claims is also provided. Advantageous refinements of the invention will become apparent from the dependent claims.

According to the present invention, an airbag system for a vehicle is provided with a first air bag and a second air bag. The second airbag is situated largely above the first airbag in the intended main direction of support. Both airbags may be triggered simultaneously. The two airbags are optionally situated in an airbag module. Both airbags may each include at least one separate gas supply, which may also be situated in the airbag module. Due to the independent gas supply for each of the airbags, it is possible for both airbags to be triggered simultaneously. The two airbags including a first airbag and a second airbag may be considered as a new unit. This new unit is also referred to below as a combination airbag. If necessary, it is able to deploy faster and, when both airbags are triggered, deeper into the vehicle interior. This may be life-saving when the vehicle occupants are in OoP positions. This airbag volume may be composed of several airbags. A typical airbag volume is approximately 90 liters. For the OoP load conditions, however, significantly larger airbag volumes are required. The volume of the combination airbag is greater than the volume of a single airbag. For example, both airbags may be 90 liters in volume. The combination airbag in this case would have a volume of 180 liters. It is advantageous if the combination airbag is inflated in a time frame similar to that of a single airbag. These airbags are intended to form a new stable unit to provide sufficient protection for the vehicle occupants.

The airbag system is characterized by the fact that both airbags may be triggered not only simultaneously, but also independently of each other. It is therefore possible for the second airbag to be triggered without the first airbag being triggered. The airbag system may comprise a control device, which determines which airbag is triggered and which is not. If both airbags are triggered, the second airbag deploys on the surface of the first airbag. Due to the separate gas supply for the two airbags, it is possible for these two airbags to be deployed simultaneously. In this case, the second airbag is situated largely above the first airbag in the intended main direction of support. The main direction of support is determined by the internal structure of the airbag module, i.e., relative to the airbag module. The combination airbag including the first and second airbags provides a correspondingly larger volume, without requiring a significantly longer inflation time. This would be a decisive advantage, since it is extremely important in an accident that the combination airbag is fully inflated in time, i.e., within a few milliseconds. This has the significant advantage that the vehicle occupants may be provided effective protection even in the case of OoP positions.

One refinement of the present invention provides that both airbags may be filled by a shared airbag module. This enables both airbags to be controlled by one control device and they are able to reliably interact.

Another embodiment of the present invention provides that the airbag module includes gas generators for filling the airbags. These gas generators are designed to fill the airbags with gas in the time range of milliseconds. The gas generators may be designed, for example, as detonators. These gas generators generate combustion gases via a chemical reaction, which fill the airbags with gas. The exact composition of the combustion gases is a function of the chemical reaction. The chemical reaction for generating the combustion gases is advantageously designed in such a way that a sufficiently large quantity of gas may be produced in a time frame of less than 25 milliseconds in order to inflate the airbags rapidly enough. The combustion gases preferably contain a high proportion of a fire-retardant gas such as nitrogen, for example. If a vehicle is set on fire as a result of an accident, the airbags are likely to be destroyed. An existing fire is not further fanned if the escaping gases are fire-retardant. If the gas generators are designed correctly, the airbag system is then able to provide its protective effect in time in the event of an accident.

Another embodiment of the present invention provides that the second airbag may be filled via a gas-tight filling tube. This filling tube provides a separate gas supply for the second airbag. In addition, an escape of the combustion gases from the filling tube is not possible. This ensures that the combustion gases enter the second airbag and also deploy it. In addition, the gas-tight filling tube prevents the escaping gas from damaging the airbag system. Escaping combustion gases could, for example, hurl vehicle parts about and injure the vehicle occupants, while at the same time not fully inflating the airbag. Thus, sufficient protection for the vehicle occupants would no longer be available. A gas-tight filling tube enhances considerably the safety of the airbag system.

In another advantageous embodiment of the invention, the first airbag is situated preferably annularly around the filling tube. Since the invention provides for both airbags to be able to trigger and that these together provide greater protection, it is expedient that both airbags are situated so as not to obstruct one other. An annular arrangement of the first airbag around the second airbag allows both airbags to be triggered independently of one another and yet they are able interact in an expedient manner. When both airbags are triggered, the second airbag is formed largely on the surface of the first airbag. Thus, it does not deploy from the dashboard but, starting immediately from the first airbag, in the direction of the main direction of support.

For the second airbag to be able to deploy in such a way, it is advantageous if the filling tube for the second airbag is elastic and compressible. If both airbags are triggered, the present invention then provides that the second airbag forms above the first airbag. This means, the second airbag in this case is slightly further removed from the airbag module than the first airbag. Because of the elastic filling tube, the gas supply of the second airbag remains while it deploys. Since the airbags are used only in accident situations, they are usually situated folded behind predetermined breaking points of the dashboard. It is therefore expedient if the filling tube is designed to be compressible. Due to the elastic properties of the filling tube, the second airbag may deploy in a position further removed from the airbag module than the first airbag, and the gas supply of the second airbag is maintained when the second airbag has deployed largely on the first airbag and is thus further removed from the instrument panel. The elastic and compressible filling tube consistently ensures a reliable supply of gas for the second airbag.

Another embodiment of the present invention provides an airbag system, in which the airbag module is designed to apply different internal pressures to both airbags in response to a control signal. This allows a triggering of the airbags appropriate to the situation. With a variable internal pressure of the airbags, it is possible to take different sizes and/or masses of the occupants into account. Different load conditions may thus be taken into consideration by a control device. A lower weight limit may be defined by a so-called "5 percent woman" and an upper weight limit by a so-called "95 percent man". In the case of the 5 percent woman, 5 percent of women are below this lower weight limit. For the 95 percent man, 95 percent of men are lighter than this weight limit. The application of different internal pressures to the airbags is able to cover the spectrum of load conditions from the 5-percent woman to the 95-percent man.

A special case of the present invention provides that the second airbag is supported directly on a wall of the airbag module when the first airbag is not triggered. This type of airbag triggering is primarily used when the vehicle occupant is not in an OoP position. For example, the occupant sits buckled up on the driver seat or front passenger seat facing the roadway. In this situation, only the second airbag is triggered in the event of an accident. This corresponds to the standard case, as it is already known today. It is very important that in this situation the first airbag is not triggered, since the vehicle occupant could otherwise be injured or crushed by the airbag system. Thus, if a vehicle occupant is in a normal sitting position as outlined above, it is actually a great disadvantage if both airbags are triggered in this situation. In this case, the vehicle occupant would be hurled back outright by these two airbags. For this reason, a control device is expedient, which is able to recognize how the airbags are to be triggered appropriate to the situation. The control device detects, if appropriate, relevant data, such as mass of the vehicle occupants, their sitting position and other data relevant for the airbag system. An unnecessary risk of injury is avoided as a result of the second airbag being triggered only when needed.

A particularly advantageous refinement of the present invention provides that when both airbags are triggered, the second airbag is supported on the surface of the first airbag facing away from the airbag module. As the first airbag deploys, the second airbag also begins to deploy on the first airbag. Because of the preferably independent gas supply for the two airbags, both are able to form simultaneously and independently. Both airbags, when fully deployed, form the combination airbag. This combination airbag has a correspondingly larger volume and may be regarded as a two-part airbag. This type of embodiment occurs, in particular, in OoP positions or when a vehicle occupant is in a comfortable or reclining position. Because these two airbags are potentially able to deploy as rapidly as a single airbag, effective protection may be provided in the event of an accident, even when the driver is in a comfortable sitting or reclining position, for example. The combination airbag is timely formed and provides a significantly larger volume than a single airbag. Since the second airbag is supported on the first airbag, the combination airbag possesses a sufficiently high stability. This combination airbag is able to deploy further into the vehicle interior than individual airbags, which deploy from a dashboard. Although the individual airbags may be dimensioned correspondingly larger, they still offer less protection than the combination airbag provided here according to the invention.

To achieve the above object, a method for operating an airbag system for a vehicle is also provided according to the invention, wherein the airbag system comprises a first air bag and a second airbag situated largely above the first airbag in the intended main direction of support, and wherein both airbags may be triggered simultaneously. Either both airbags are triggered together or only the second airbag is triggered without the first airbag being triggered.

The invention also includes refinements of the method according to the invention, which include features as were previously described in connection with the refinements of the airbag system according to the invention. For this reason, the corresponding refinements of the method according to the invention are not described herein again.

Figure 2:
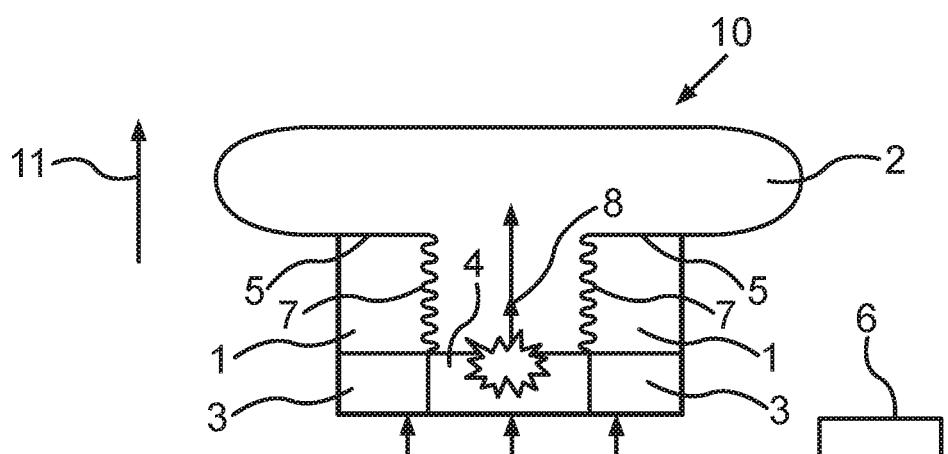
FIG. 2 illustrates a side view of the airbag system, where only the second airbag deploys, according to some embodiments of this disclosure.
Figure 3:
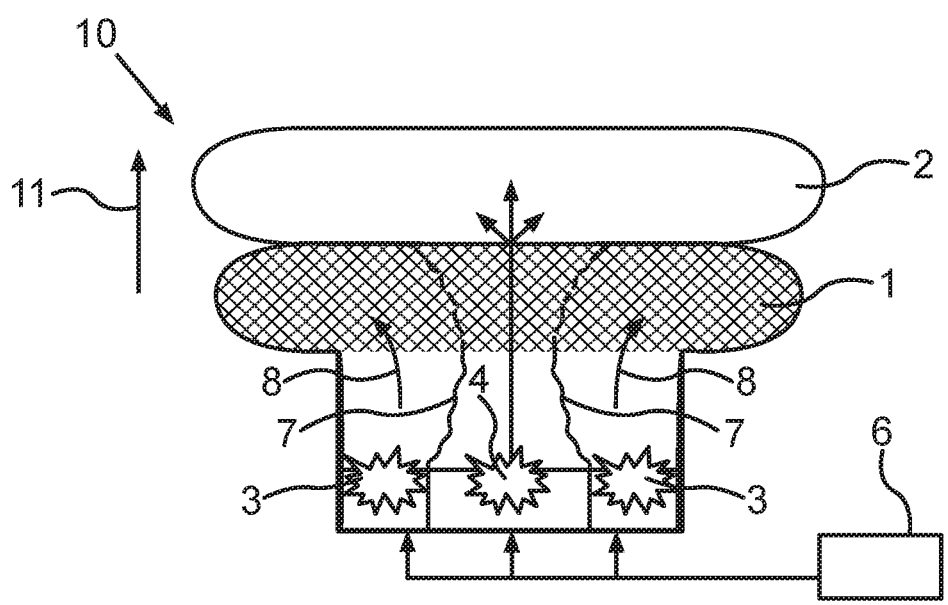
FIG. 3 illustrates a side view of the airbag system, where both airbags are used, according to some embodiments of this disclosure.

Exemplary embodiments of the invention are described below. In the drawings:

FIG. 1 shows a side view of the airbag system in the untriggered state;

FIG. 2 shows a side view of the airbag system, where only the second airbag deploys and FIG. 3 shows a side view of the airbag system, where both airbags are used.

The exemplary embodiments explained below are preferred embodiments of the invention. In the exemplary embodiments, the described components of the embodiments each constitute individual features of the invention to be considered independently of one another, each of which independently further refines the invention, and are therefore also to be considered as part of the invention individually or in a combination different from that shown. In addition, features of the invention other than those already described may be added to the embodiments described.

In the drawings, elements having the same function are each provided with the same reference numerals.

FIG. 1 shows the side view of the airbag system 10 in the non-activated state. The airbag module 9 is connected to a control device 6. This control device 6 allows the airbag system 10 to be triggered in various ways. At least two different airbags are situated within the airbag module 9. The first airbag 1 is situated laterally inside the airbag module 9. In this example, the first airbag 1 does not expand to reach the surface 5 of the airbag module 9. The surface 5 of the airbag module 9 is in most cases the plane of the dashboard. Situated inside the airbag module 9 between the two parts of the first airbag 1 and above it is a second airbag 2. The surface 5 of the airbag module 9 closes the airbag module 9 upwardly. However, the two visible parts of the first airbag 1 in FIG. 1 need not be formed separately, they may be annularly situated and may form a unit. The first airbag 1 has a gas supply 3, which may also be annularly situated. The second airbag 2 has a separate gas supply 4. If no signal is sent by the control device 6 to the airbag module 9 for triggering, then the airbag system remains in the non-activated state, as shown in FIG. 1.

If an accident-relevant event is detected by the control device 6 or a corresponding signal is detected, a trigger signal is then sent to the airbag system 10. If in this case the vehicle occupants are in the so-called standard sitting position, then only the second airbag is triggered. In this case, only the gas generator 4 for the second airbag 2 is activated. The other gas generator 3 for the first airbag is not actuated. As a result of the production of gas by the gas generator 4, gas 8 flows through the filling tube 7 into the second airbag 2. The filling tube 7 in this case is designed to be gas-tight, so that the gas 8 produced by the gas generator 4 flows exclusively through the filling tube 7 into the second airbag 2 and inflates it. An escape of the gas 8 through the filling tube 7 is not possible. Since the two airbags have independent gas supplies, the second airbag 2 may be inflated independently of the first airbag 1 and also simultaneously.

FIG. 2 corresponds in its deployment shape to the so-called standard airbag, as it is already found in many vehicles today. If only the second airbag 2 deploys, as shown in FIG. 2, it is supported on the surface 5 of the airbag module 9. The second airbag 2 deploys in the main direction of support 11. In this case, it may also be partially supported on the first airbag 1. The airbag system 10 thus provides that not only OoP load conditions, but also standard load conditions may be covered.

In FIG. 3, the state of the airbag system is shown when both airbags are triggered. In this case, the control device 6 sends signals to the airbag module 9 in order to simultaneously trigger both airbags and to inflate the combination airbag. The combination airbag also deploys in the main direction of support 11, as in the case of FIG. 2. This situation is particularly advantageous when the vehicle occupants are in an OoP position or have assumed a comfortable or lying position. The gas generator 4 produces gas 8, which flows through the gas-tight filling tube 7, and fills the second airbag 2 with gas 8. At the same time, the gas generator 3 provides combustion gases, which flow into the first airbag 1. Since the first airbag 1 is situated annularly around the filling hose 7, it forms a ring. The first airbag is formed similar to a floating ring. Located in the middle in this situation is the filling tube 7, which forms the second airbag 2 in the direction of the main direction of support 11.

Both airbags may be inflated simultaneously and independently of one another. It is not necessary in this case for the gases 8 to have to flow from one airbag into the other. As the first airbag 1 deploys, the second airbag 2 rises upward. Rising upwards at the same time is the elastic and stretchable filling tube 7. The elastic and compressible filling tube 7 rises up similar to an accordion. At the same time, combustion gases supplied by the gas generator 4 flow through the filling tube into the second airbag 2. This causes the second airbag 2 to be formed on the surface of the first airbag 1. The second airbag 2 is deployed as shown in FIG. 2. At the same time, however, the second airbag 2, while it is deploying, rises simultaneously upwards in FIG. 3. The airbag system 10 enables two airbags to deploy at a rate similar to a single airbag. They support each other in the direction of the main direction of support 11 and provide a significantly larger airbag volume. At the same time the required inflation time may be kept as short as is currently the case with airbags.

If a vehicle occupant is in an OoP position, a sufficiently large airbag volume may be timely provided by the airbag system shown in FIG. 3. The first airbag 1 and the second airbag 2 form the combination airbag. This combination airbag moves closer to the vehicle occupant within the same period of time than is the case in FIG. 2. Thus, in the event of an accident, it is possible to prevent a vehicle occupant previously in an OoP position from being hurled around by the vehicle and injured in addition. Particularly worth protecting is the head of the vehicle occupants. In the event of an accident, the task of the airbag system 10 is to reach the head of a vehicle occupant in time and to protect it. If the vehicle occupant is in an OoP position, then an optimally effective protection for him/her, especially for the head, can not be achieved with a standard airbag operating as shown in FIG. 2. If an accident does occur in which the vehicle occupant is buckled up, but is in an OoP position, the belt would then firmly hold primarily the torso of the vehicle occupant. His/her head, however, would continue to move due to inertia. In order to avoid serious injuries in this situation, such as a broken neck, the head should be supported. This is achieved with an airbag system 10 according to the present invention, as shown in FIG. 3. Both airbags would be triggered in this case and reach the head of the vehicle occupant in time to effectively protect him/her. On the other hand, if the vehicle occupant had been in a standard sitting position, only the second airbag 2 would have deployed, as shown in FIG. 2.

The present invention increases the safety of the vehicle occupants and enables them to assume new sitting positions without having to overly compromise in terms of safety.

During autonomous driving, the vehicle occupants are able to assume an OoP position. Such a position may be, for example, moving the driver seat or front passenger seat back and/or turning the seats. The vehicle occupants in this case may move away from the airbag module 9. If an accident occurs in this situation, a conventional standard airbag, as shown in principle in FIG. 2, does not provide adequate protection in all situations. At high speed, a vehicle occupant would hit the airbag at high speed, penetrate into it somewhat, deform it so to speak, and then he/she could be thrown back with great force. It is also conceivable that vehicle occupants who are in an OoP position, are not cushioned in the case of a standard airbag, as shown in principle in FIG. 2. It could therefore be that in the event of an accident, a vehicle occupant will fly past the airbag and strike elsewhere and become seriously injured in the process. In contrast, by triggering the two airbags 1 and 2, a larger airbag volume is provided in the same time period as is provided with a single standard airbag. The combination airbag significantly reduces the distance to the vehicle occupants and prevents them from being tossed around uncontrollably in the vehicle.

The combination airbag is advantageously oriented in such a way that the head of the vehicle occupant, in particular, is effectively protected. The combination of first and second airbags 1 and 2 significantly increases the safety of vehicle occupants in OoP positions. By allowing both airbags to deploy simultaneously and independently of one another, the combination airbag of first and second airbag 2 may be deployed at a rate similar to that of a standard airbag, as shown in principle in FIG. 2. This combination airbag fills a larger volume and helps to protect vehicle occupants in an accident when they are in OoP positions. The airbag system 10 disclosed in this invention is able to respond flexibly to various load conditions, in each case providing effective protection for the vehicle occupants.

The invention claimed is:

1. An airbag system for a vehicle, comprising:
a first airbag;
a second airbag situated above the first airbag in a main direction of support, wherein the first and second airbags are arranged in an airbag module and are finable by the airbag module, wherein the first and second airbags are configured to be triggered simultaneously when both airbags are triggered, and wherein the first and second airbags are configured to be triggered independently of one another; and
a control device configured to control the first and second airbags,
wherein the second airbag is configured to be triggered without the first airbag being triggered,
wherein the control device is configured to send a triggering signal for triggering to the airbag module,
wherein the control device is further configured to detect a sitting position of a vehicle occupant and to trigger only the second airbag in response to the vehicle occupant being in the predetermined standard sitting position, and
wherein the second airbag is supported directly on a wall of the airbag module when the first airbag is not triggered.

2. The airbag system of claim 1, wherein the airbag module comprises gas generators for filling the first and second airbags.

3. The airbag system of claim 1, wherein the second airbag is filled via a gas-tight filling tube.

4. The airbag system of claim 3, wherein the first airbag is situated annularly around the gas-tight filling tube.

5. The airbag system of claim 3, wherein the gas-tight filling tube of the second airbag is elastic and compressible.

6. The airbag system of claim 1, wherein the airbag module is configured to apply different internal pressures to the first and second airbags in response to a control signal.

7. The airbag system of claim 1, wherein the second airbag is supported on a surface of the first airbag facing away from the airbag module when both airbags are triggered.

8. A method for operating an airbag system for a vehicle, the method comprising:
detecting, using a control device, a sitting position of a vehicle occupant; and
sending, by the control device, a signal for triggering to an airbag system, wherein the airbag system comprises a first airbag and a second airbag situated above the first airbag in a main direction of support; wherein the first and second airbags are situated in an airbag, module and are finable by the airbag module, wherein the control device is configured to control the first and second airbags, wherein the first and second airbags are configured to be simultaneously triggered when both airbags are triggered, and wherein the first and second airbags are configured to be triggered independently; and in response to the vehicle occupant being in a predetermined standard sitting position, triggering, by the control device, only the second airbag without the first airbag being triggered, wherein the second airbag is supported directly on a wall of the airbag module when the first airbag is not triggered.

* * * * *